United States Patent [19]

McCoy

[11] 4,301,475
[45] Nov. 17, 1981

[54] COMBINATION DIGITAL-ANALOG TELEVISION SWITCHING SYSTEM

[75] Inventor: Reginald F. H. McCoy, Gainesville, Fla.

[73] Assignee: Vital Industries, Inc., Gainesville, Fla.

[21] Appl. No.: 124,064

[22] Filed: Feb. 25, 1980

[51] Int. Cl.³ ............................................. H04N 5/22
[52] U.S. Cl. .................................... 358/181; 358/183
[58] Field of Search ................. 358/183, 181, 22, 142; 179/2 TS, 18 E, 18 C, 18 EA, 1 CN, 18 ES

[56] References Cited

U.S. PATENT DOCUMENTS 4,145,719  3/1979  Hand ................................. 358/183

FOREIGN PATENT DOCUMENTS 52-8721  1/1977  Japan .................................. 358/183
2022355  12/1979  United Kingdom ................ 358/183

OTHER PUBLICATIONS

Broadcast Quality Video Processing System, Model AV-7000 Panasonic.

*Primary Examiner*—Michael A. Masinick
*Attorney, Agent, or Firm*—Mason, Kolehmainen, Rathburn & Wyss

[57] ABSTRACT

A combined analog and digital video television signal switching system is provided in which parallel video signal paths are provided for analog and digital television signals, these paths being controlled by common control signals.

When a video input signal is digital it is supplied to the digital signal path and an analog zero reference signal is supplied to the corresponding analog input in the analog signal path. When a video input signal is analog it is supplied to the analog signal path and a digital zero reference signal is supplied to the corresponding digital input in the digital signal path.

The analog mixers in the analog signal path and the digital mixers in the digital signal path are each controlled by the same control signals generated by the common control equipment. If the common mixer control signals generated are in analog form they are used directly to control the analog mixers in the analog signal path and are converted to digital form for controlling the digital mixers in the digital signal path. If these common control signals are in digital form they are used directly to control the digital mixers and are converted to analog form to control the analog mixers. Conversions from digital to analog and/or from analog to digital are performed at the output of the switching system to suit the requirements (digital or analog) of subsequent equipment. When the subsequent equipment requires a digital input all digital inputs to the switching system will remain digital throughout and analog inputs will suffer only one conversion at the output of the switching system. The converse applies when the subsequent equipment requires an analog input.

47 Claims, 6 Drawing Figures

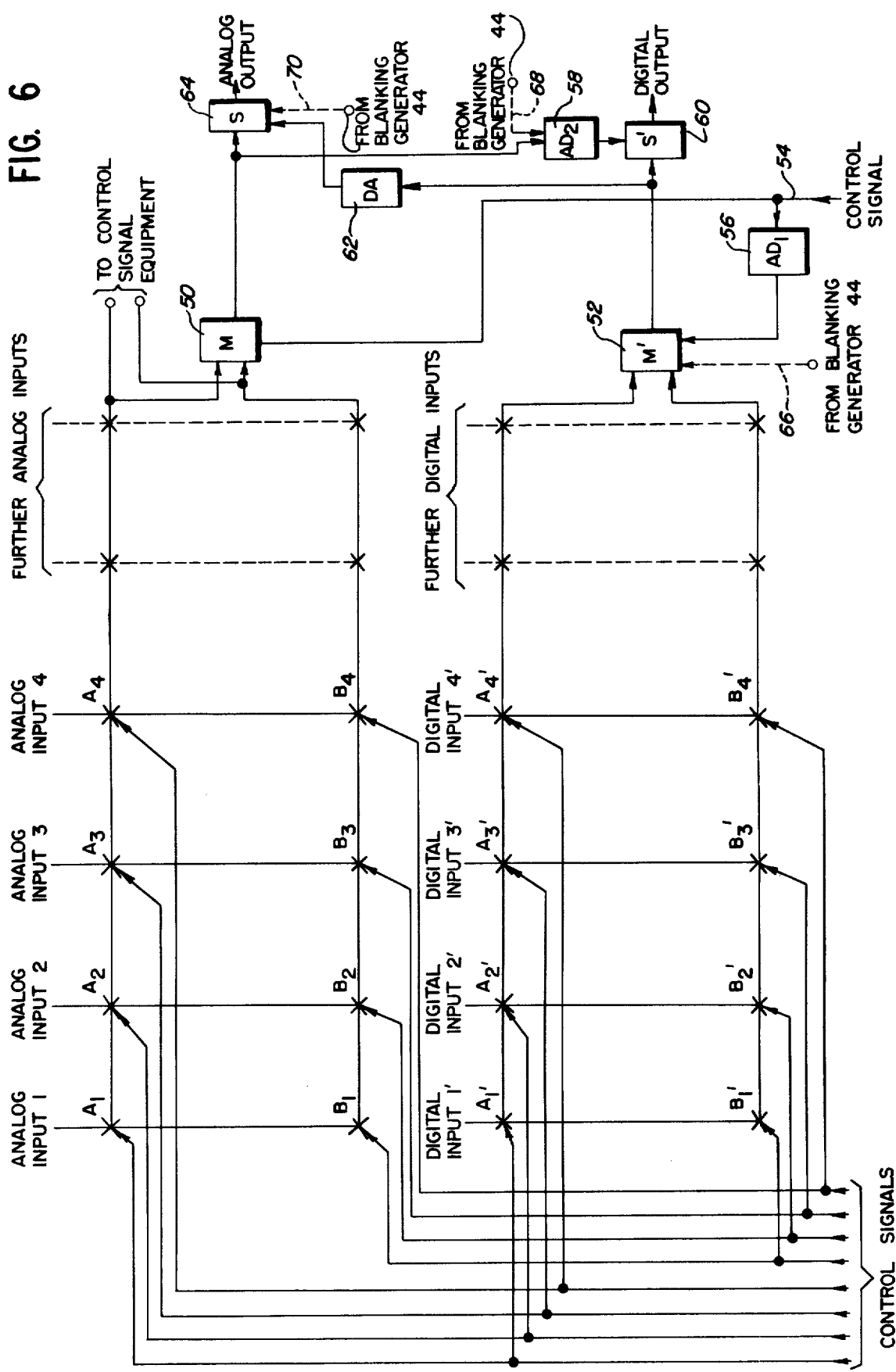

COMBINATION DIGITAL-ANALOG TELEVISION SWITCHING SYSTEM

BACKGROUND OF THE INVENTION

The present invention relates to television signal switching systems of the type normally employed in television studio equipment to provide various types of television displays involving portions of more than one video input signal, or transitions from one video input signal to another.

Television signals may be broadly classified into two groups, namely, analog and digital. The majority of present day signal sources generate analog signals but there is an increasing use of equipment which generates digital signals.

Analog television (or video) signals are those in which a continuously varying voltage represents the picture information, both its brightness (or luminance) and its color content (or chrominance), the latter commonly being in the form of a modulated subcarrier added to the luminance signal.

Digital television signals are those in which the value of the signal representing picture information is sampled at specified times and this value is represented by a number, typically in binary code. These binary coded signals may then be handled by well-known circuit techniques. The value which is sampled may be that of the composite signals containing both luminance and chrominance information, or, alternatively, the luminance and chrominance components may be separated before they are sampled and converted to digital numbers.

Present day equipment for switching television signals are designed to handle analog signals. Consequently the outputs of digital sources have to be converted to analog form for switching and if digital output signals are required the switcher output must be reconverted from analog back to digital form.

Equipment and circuits for handling analog signals are prone to introduce various forms of distortion of the signal. In contrast, in digital equipment circuits can be designed to avoid these distortions. However, digital systems are limited to a discrete range of whole numbers, that is, they represent variations in the input as a series of steps and cannot distinguish input values lying between these steps. Such values will be represented by the nearest whole number value. Thus, a signal converted from analog form to digital form and then back to analog form will not be precisely identical to the original analog signal, but will contain errors where intermediate input values have been rounded off to the nearest digital whole number value. Errors are also introduced when a digital input is converted to analog form and then back to digital form because of small variations in gain and level and also of nonlinear distortions introduced by the analog circuits. These errors can result in the output digital number differing from the input digital number.

Repeated conversions of a signal between digital and analog forms are thus undesirable because of the degradation introduced by these conversions. It is highly desirable that digital signals should be processed in digital form and only converted to analog when this is to be the final output form with no requirement for reconversion to digital signals.

SUMMARY OF THE INVENTION

Briefly considered, the combined analog and digital video signal switching system of the present invention is one in which parallel video signal paths are provided for analog and digital input signals, these paths being controlled by common control signals. When a video input signal is digital it is supplied to the digital signal path and an analog zero reference signal is supplied to the corresponding analog input in the analog signal path. When the video input signal is analog it is supplied to the analog signal path and a digital zero reference signal is supplied to the corresponding digital input in the digital signal path.

The analog mixers in the analog signal path and the digital mixers in the digital signal path are each controlled by the same control signals generated by the common control equipment. If the common mixer control signals generated are in analog form they are used directly to control the analog mixers in the analog signal path and are converted to digital form for controlling the digital mixers in the digital signal path. If these common control signals are in digital form they are used directly to control the digital mixers and are converted to analog form from to control the analog mixers.

Each function in the video path is thus duplicated in analog and digital form but all control functions are common to the two. There is thus provided a system in which digital sources will be switched, mixed, wiped or keyed in exact correspondence with their analog counterparts, and each type of signal will retain its own form (digital or analog) throughout the switching system. Conversions from digital to analog and/or from analog to digital are then performed at the switcher output to suit the requirements (digital or analog) of subsequent equipment. When the subsequent equipment requires a digital input all digital inputs to the switcher will remain in digital form throughout and analog inputs will suffer only one conversion at the switcher output. The converse applies when the subsequent equipment requires an analog input.

BRIEF DESCRIPTION OF THE DRAWINGS

The invention, both as to its organization and method of operation, together with further objects and advantages thereof, will best be understood by reference to the following specification taken in connection with the accompanying drawings in which:

FIG. 6 is a block diagram illustrating the combined digital-analog switching system of the present invention.

Figure 1:
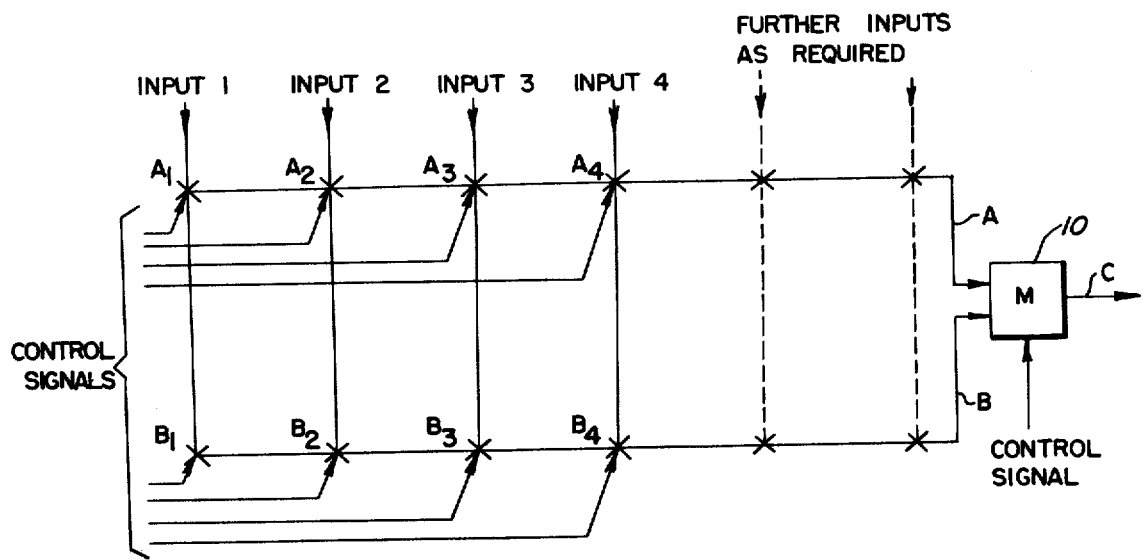
FIG. 1 is a block diagram of a single crosspoint and mixer portion of an existing analog switching system.

Referring now to the drawings and more particularly to FIG. 1 thereof, the video path through present day switching systems is composed of crosspoints, i.e.

switches, to select between a number of video input sources, and mixing circuits which provide a gradual transition between sources, the mixing circuits being controlled by a control signal which may come from a pattern wave form generator, a key signal generator, a manual or automatic mix control, or combinations of these and other control functions.

FIG. 1 shows a block diagram of the video path of a simple video switching system. This path consists of two rows of crosspoints identified as A1, A2, A3, A4, etc. and B1, B2, B3, B4, etc. in each case up to any desired number. These crosspoints permit selection of any two of the inputs 1, 2, 3, 4, etc. These two inputs, A and B, are fed to a mixer 10 which can select any proportion of its two inputs to provide a combined output C. Usually but not necessarily, the sum of the proportions of the two input signals is made equal to unity, that is, if a proportion $K_A$ of input A is selected, the proportion $K_B$ of input B that will be simultaneously added to it is given by $K_A$ plus $K_B$ equals 1. One control variable $K_A$ is then sufficient to control the mixer 10.

Figure 2:
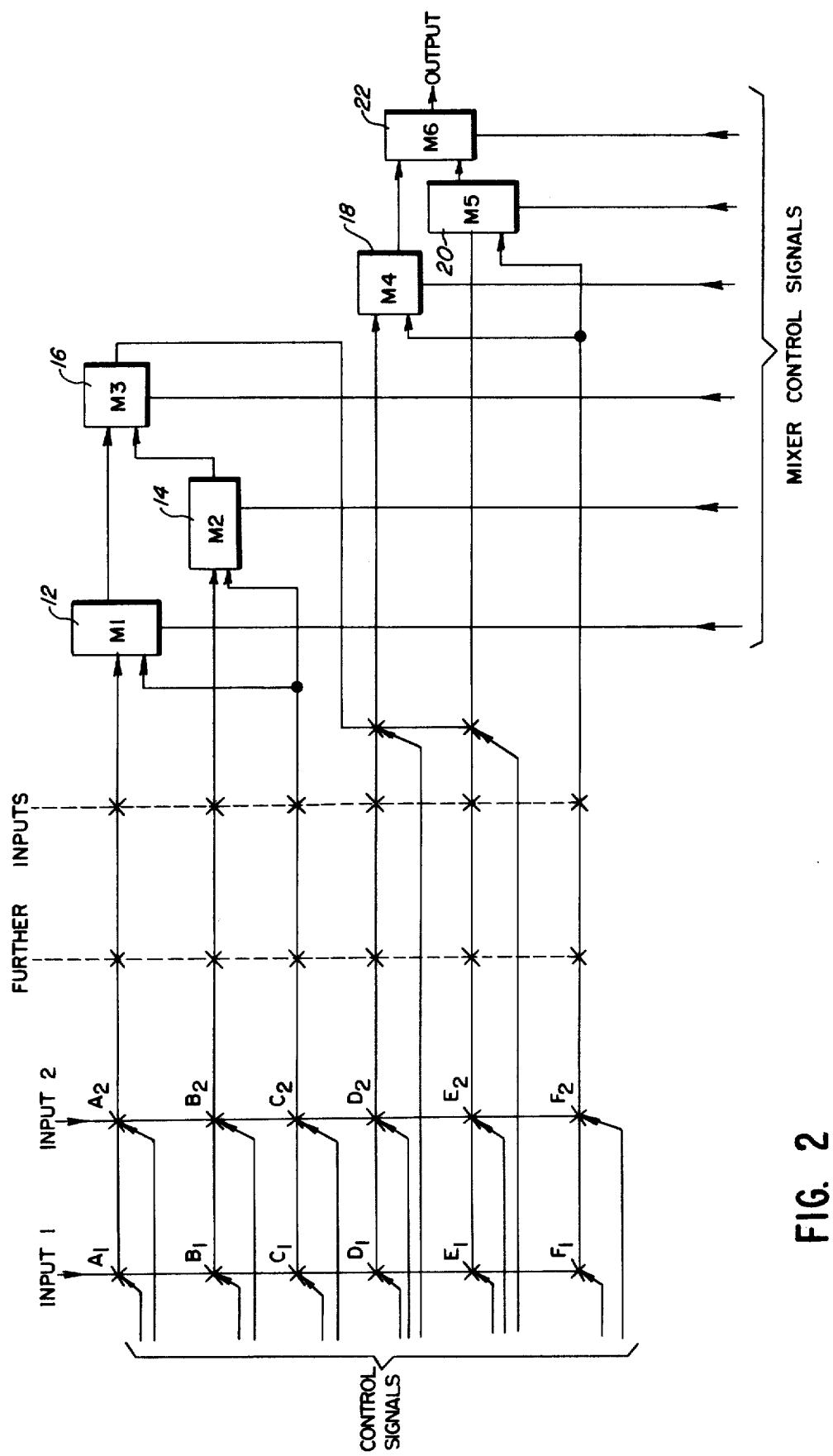
FIG. 2 is a block diagram of a more complicated switching system which is of the type generally employed in present day analog switching systems.

Practical switching systems usually consist of cascaded crosspoints and mixers, each individually functioning as shown in FIG. 1. A block diagram of a more complicated switcher is shown in FIG. 2, wherein six rows of crosspoints are provided. Rows A1, A2, etc. and C1, C2, etc. provide the two inputs to mixer 12; rows B1, B2, etc. and C1, C2, etc. provide the inputs to a second mixer 14. In this particular configuration, one of the inputs to each of the mixers 12, 14, is common. This is illustrative of one possible configuration, but it should be understood that the inputs to each of the mixers 12, 14 may comprise separate inputs if desired. The outputs of the mixers 12 and 14 then form the inputs for a third mixer 16.

This configuration is then duplicated by crosspoint rows D1, D2, etc. E1, E2, etc. and F1, F2, etc. with mixers 18, 20 and 22. However, it will be noted that the output of the mixer 16 appears as an input to the crosspoint rows D and E. This is commonly referred to as a re-entry. With such an arrangement, combinations of video sources formed by the mixers 12, 14, 16 may be selected as an input to the duplicate section 18, 20, 22 for formation of more involved combinations of input sources. This principle of providing crosspoints, mixers and re-entry provisions may be extended to form any desired size of switching system.

Each crosspoint must be supplied with a control signal in order to determine which of the video sources is to be selected. These control signals may originate from manually operated buttons or switches or from a computer. A block diagram of a typical control signal generation system from manual control of one row of crosspoints is shown in FIG. 3, it being understood that the circuit of FIG. 3 must be repeated for each row of crosspoints.

Figure 3:
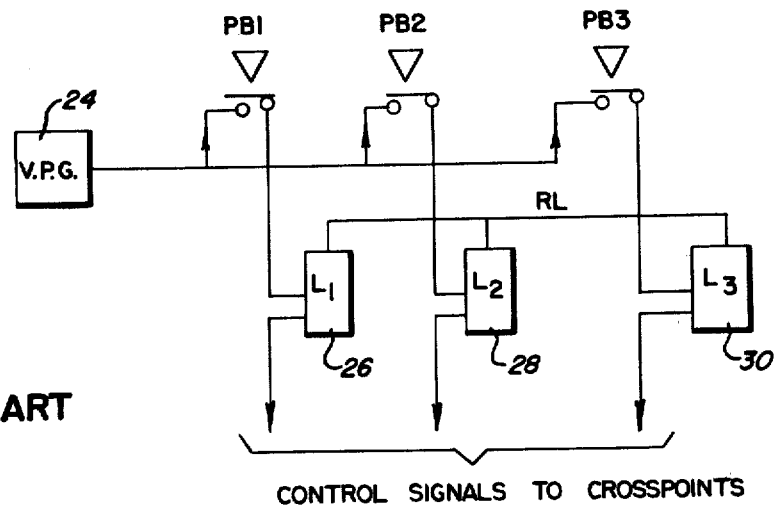
FIG. 3 is a block diagram of a typical circuit arrangement for providing control signals for the crosspoints in the systems of either FIG. 1 or FIG. 2.

Referring to FIG. 3, PB1, PB2, PB3, etc. represent pushbuttons which make momentary contact when pressed. When this contact is made, a pulse from the vertical pulse generator 24, which is common to the pushbutton switches, is supplied to one of a series of latches 26, 28, 30, etc. corresponding to the pressed button. This pulse causes the latch to assume and retain a particular voltage state referred to as the energized state. Simultaneously a voltage change is produced on the release line RL, which is common to all of the latches 26, 28, 30, etc., so as to cause any previously energized latch to be de-energized. Thus, at any one time only one latch will be energized. The latches 26, 28, 30, in turn provide the control signals which determine which of the crosspoints will pass its input to the common output line A or B.

The vertical pulse generator 24 produces a pulse during the vertical blanking period of the television signal. The latches 26, 28, 30 can thus only be energized and de-energized during this pulse so that the crosspoints will only change condition during the blanking interval. In this way, when a new video signal is selected, the selection occurs during the blanking interval and not during the time when the picture is visible; the change of source will thus not occur when the picture is only partially completed which would result in an undesirable appearance of a picture in which part was derived from one source and part from another. It should be pointed out that in a large switching system the pushbuttons and latches and their associated wiring required for control of a large number of crosspoints constitutes an appreciable part of the switching system.

Each mixer in the switching system also requires a control signal. In its simplest form this control signal may comprise a voltage derived from a manually operated lever. This permits a mix to be made between the two inputs to the mixer as the lever is moved. The change of control voltage may alternatively be generated automatically and initiated by a manually operated button, or may be generated by a computer.

Figure 4:
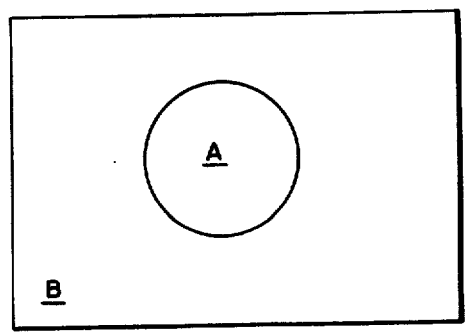
FIG. 4 is a diagrammatic illustration of a typical pattern which may be obtained by present day switching equipment.

For more complex effects, control voltage wave forms which vary at rates synchronized to the horizontal and vertical rates of the television signal wave form may be employed. Many different patterns may be produced by suitable choice of wave forms; these patterns consisting of an area in which one of the two input pictures is visible surrounded by, or separated from, an area in which the other input picture appears. An example of a typical wave form is shown in FIG. 4. In this figure a circular pattern is the result of an appropriate choice of wave form described above; inside the circle the picture from input A to the mixer appears; outside the circle the picture from input B appears. The boundary between the two inputs may be sharp or diffuse depending upon the rate of change of the control voltage. In this connection it will be understood that FIG. 4 is but one example of the type of effect which may be obtained from appropriate pattern wave forms.

A further function for which the mixer is commonly employed is the keying of one picture into another. In this case, the control voltage to the mixer is a key signal, derived from a video source by shaping and clipping of the video wave form. For example, the video source which provides the key signal could consist of lettering. This will then cause the mixer to mix from its A input source to the B input source in the area of the lettering. The B input source may be the same as the source used to provide the key signal in which case the result is to insert the lettering into the A picture. Alternatively, the B input may come from a source generating a uniform color in which case the lettering will appear in this color inserted into the A input picture. Other variations, in which the lettering is caused to appear surrounded by black or colored borders are also possible. It is common practice in a complete switching system to provide internal generators for uniform colors and black for this and other applications. For the purpose of the present invention, these internal generators may be considered as further inputs to suitable crosspoints which feed the mixers of the switching system.

Another form of keying which is frequently employed consists in deriving the key signal from the color component of a video signal. In this mode, commonly known as chroma key, a picture comprising a foreground subject in front of a background of uniform color, such as blue, will be used as the keying source and as one input to the mixer. The other input to the mixer will be a different scene. The keying signal will cause the mixer to pass the foreground subject, but will substitute the second scene for the blue areas of the keying video source.

Figure 5:
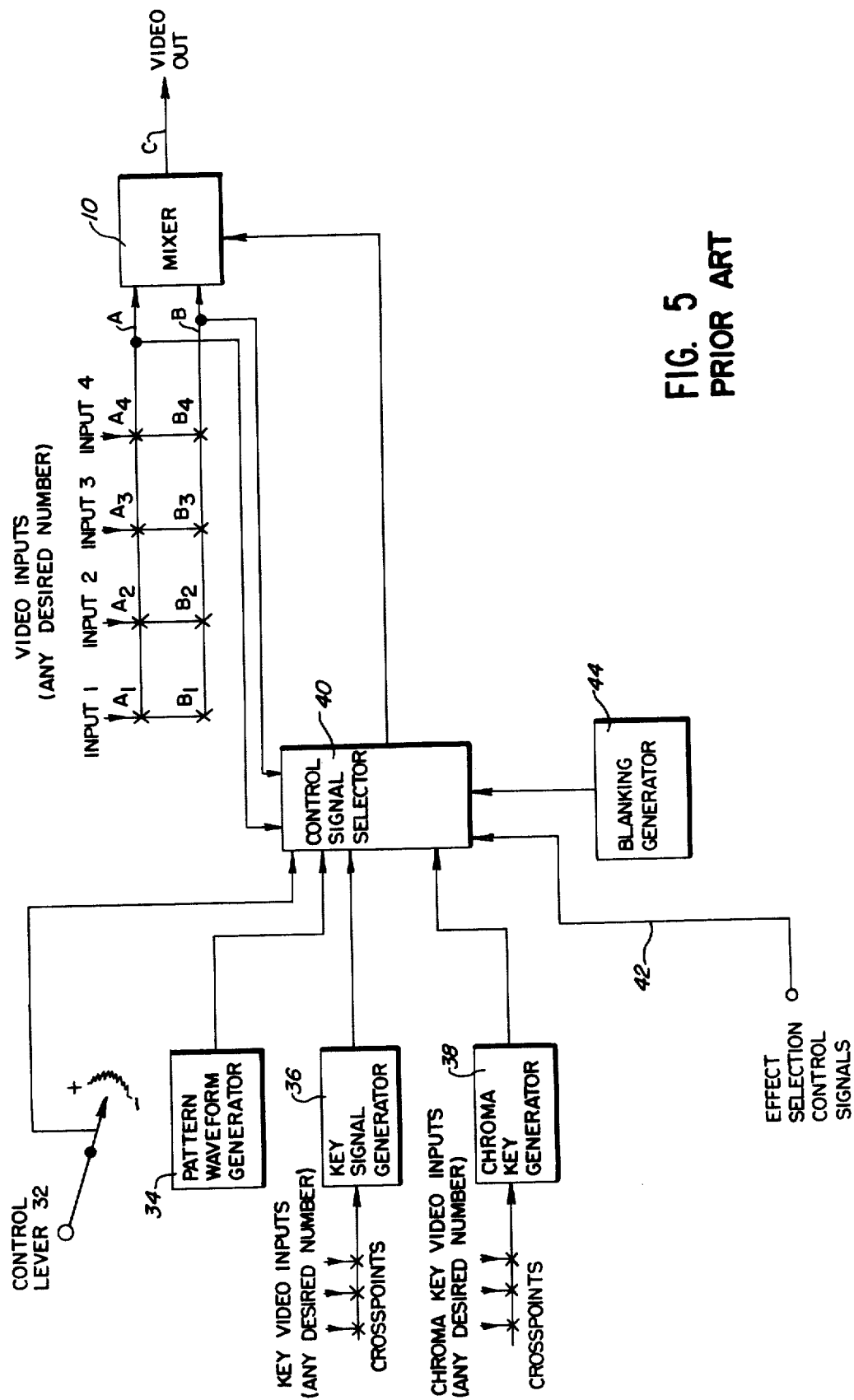
FIG. 5 is a block diagram of a conventional analog switching system including the control signal generating and selecting portions of the switching system.

The combination of mixer, pattern wave form generator and keying circuits is frequently referred to as a mix/effects units. Referring to FIG. 5, there is shown therein a block diagram of a typical mix/effects unit which comprises a control lever 32, a pattern wave form generator 34, a key signal generator 36, and a chroma key signal generator 38, the functions of which have already been described. There is also provided a control signal selector 40 which is employed to select any one or combination of the control signals from the units 32–38, inclusive. The control signal selector 40 in turn requires control inputs 42 to effect the required selection, which inputs may come from manually operated buttons or other means.

There is also provided a blanking generator 44 which functions to override the other control inputs to the control signal selector 40 during the blanking intervals so that the mixers of the switching system controlled by the control signal selector 40 will select either the A input or the B input but not a combination of these two inputs during blanking intervals. The purpose of such an arrangement is to prevent combinations of the synchronizing information (which occurs during the blanking intervals) from two different video sources from occurring.

In FIG. 5 only a simple crosspoint mixer portion of the switching system is shown, such as described previously in connection with FIG. 1. However, it will be understood that more complicated switching arrangements, such as shown and discussed heretofore in connection with FIG. 2 are customarily controlled from the common control equipment shown in FIG. 5, in which case appropriate control signals are provided from the control signal selector 40 to each of the mixers of the switching system, such as the mixers 12–22 of FIG. 2. It is also pointed out that control signals for the crosspoints associated with the mixer 10 in FIG. 5 have been eliminated to simplify the drawing. It is further pointed out that the synchronizing information of the selected A input and the selected B input are also supplied to the control signal selector 40 (as indicated in FIG. 5) and to the various wave form generators 34, 36 and 38 so that these control signals may be synchronized with either one or the other of these two video inputs.

The blanking generator 44 takes the sync pulse of either of these video inputs and generates a blanking pulse equal in width to the blanking intervals (both horizontal and vertical) of that particular video signal, this blanking pulse then being employed to force the associated mixer, such as the mixer 10, to select either the A input or the B input but not a combination of both during blanking intervals.

In this connection it is pointed out that in practical switching systems the control functions provided by the control equipment of FIG. 5 usually account for a large part of the switching system which, in accordance with the present invention, is not duplicated in a combined digital-analog switching system.

As discussed generally heretofore, the present invention provides parallel video paths for the analog and digital signals, these paths being controlled by common control signals. There will thus be digital switches controlled by the same control signals that control the corresponding analog crosspoints and digital mixers (or multipliers) controlled by the same control signals (converted to digital form) that control the analog mixing circuits. Each function in the video path is, in accordance with the present invention, duplicated in analog and digital form, but all control functions are common to the two. Accordingly, in the system of the present invention, digital sources will be switched, mixed, wiped or keyed in exact correspondence with their analog counterparts and each type of signal will retain its own form (digital or analog).

In FIG. 6 is shown the block diagram of a simple implementation of the present invention, corresponding to the simple analog-only switcher of FIG. 1. Referring to FIG. 6, it will be seen that for each of the analog inputs 1, 2, 3, 4, there are provided corresponding digital inputs 1', 2', 3', 4', etc. For each of the analog crosspoints A1, A2, A3, A4, etc. and B1, B2, B3, B4, etc. there are provided corresponding digital crosspoints A1', A2', A3', A4', etc. and B1', B2', B3', B4', etc. However, corresponding analog and digital crosspoints receive the same control signal. Thus, when any particular analog input is selected by a crosspoint, for example A1, the corresponding digital input will be selected by the corresponding digital crosspoint A1'. The control circuits for the crosspoints (both analog and digital) are unchanged and remain as shown for example, in FIG. 3 discussed in detail heretofore.

It should be understood that any individual video input source will be either analog or digital, and this fact will be known when the sources are connected to the switcher. In accordance with an important feature of the present invention, when a source is digital, the corresponding analog input is fed with an analog zero reference signal, and when a source is analog the corresponding digital input is fed a digital zero reference signal or level.

Thus, if, for example, the first source is digital, it will be connected to input A1' and an analog zero reference signal will be connected to input A1. If the second source is analog, it will be connected to input A2 and a digital zero reference signal will be connected to input A2'. The selected signals, analog and digital, from the crosspoints, are fed to an analog mixer 50 and a digital mixer 52, respectively. These mixers perform identical functions using analog and digital circuits, respectively.

The control signal for the analog mixer 50 is unchanged from that used for the analog-only switcher of FIG. 1 and may, for example, be generated by circuits having the form shown in FIG. 5, this control signal being supplied over the conductor 54 to the mixer 50. This same control signal is converted from analog to digital form by an analog to digital converter 56 the output of which is then supplied to the digital mixer 52. This conversion is necessary because the mixer 52 functions by digital techniques, as will be readily understood by those skilled in the art. In the event that the control signal generated by the common control equipment of the switching system comprises a digital control signal, this digital control signal would be supplied directly to control the digital mixer 52 and would be converted to analog form by means of a suitable digital to analog converter the output of which would then be employed to control the analog mixer 50.

Accordingly, the two mixers 50 and 52 will duplicate each other's operation since they receive corresponding control signals. The output of the analog mixer 50 will contain all of the analog sources that have been selected. However, where a digital source has been selected, zero will appear since the corresponding analog input in this case receives a zero reference signal, instead of an analog video input signal.

Similarly, the output of the digital mixer 52 will contain those digital sources that have been selected but with zero substituted for the analog sources. For example, if the mixer control signal is the pattern wave form that produces the circle effect of FIG. 4, and if source A is digital and source B is analog, then the output of the analog mixer 50 will have zero reference within the circle and B video outside the circle. The output of the digital mixer 52 will have a video inside the circle and zero reference outside the circle.

The outputs of the analog mixer 50 and the digital mixer 52 are thus treated as one dual path mixer output, which may then be supplied to the input of a subsequent mixer, as described in detail heretofore in connection with FIG. 2. For example, the analog mixer 50 and digital mixer 52 could comprise, for example, the dual path equivalent of the output of the mixer 12 in FIG. 2. Both the analog output of the mixer 50 and the digital output of the digital mixer 52 would then be supplied over separate paths to one input each of an analog mixer and a digital mixer, respectively, forming the equivalent of the mixer 16 in FIG. 2.

In FIG. 6 it is assumed that the mixers 50, 52 form the last mixer stage of the switching system. At the output of the switcher there is thus provided a digital signal, i.e. the output of the mixer 52, which comprises all of the selected digital sources in their correct proportions but with zero level in place of analog source selections. Similarly, the output of the analog mixer 50 will be an analog signal comprising all of the selected analog input sources in their correct proportions but with zero level in place of all digital source selections. In accordance with a further important feature of the invention the analog output from the mixer 50 may be converted to digital and added to the digital output of the digital mixer 52 so that the digital video output signal will be provided containing all selected sources in their correct proportions, both analog and digital and wherein the digital sources have remained digital throughout the entire switching system and the analog sources have undergone only one conversion after the last mixer stage of the switching system. Similarly, if the digital output of the digital mixer is converted to analog and added to the analog output of the analog mixer 50, a completely analog video output signal is provided containing all selected sources in their correct proportions, both analog and digital, wherein the analog sources have remained analog throughout and digital sources have undergone only one conversion after the last mixer stage of the switching system.

To accomplish this, the output of the analog mixer 50 is connected to the analog to digital converter 58 the output of which is supplied as one input to a digital summing circuit 60 to the other input of which is applied the digital output of the digital mixer 52. The output of the digital summing circuit 60 thus contains the contributions from both inputs, in digital form. Similarly, the output of the digital mixer 52 is converted to analog form in a digital to analog converter 62 the output of which is supplied as one input to an analog summing circuit 64 to the other input of which is applied the analog output of the analog mixer 50. The output of the summing circuit 64 thus contains the contributions from both inputs, this time in analog form. In this connection it will be understood that the output of the switching system is provided in either analog form or digital form, or both, depending upon the type of input required by the studio equipment which receives the switching system output, and in some instances only one output, either digital or analog, will be required.

While in the example described above the control signal to the mixers 50, 52 was a pattern wave form suitable to provide the display shown in FIG. 4, it will be appreciated that the system operates in identical fashion if the control input is a keying signal, or a chroma keying signal, or a simple mix voltage.

In the case of a simple mix voltage, the analog mixer 50 will produce proportions KA and KB of its two inputs, as previously described. Assuming that source A1' is digital and source B is analog, the analog input A1 would therefore be fed with a zero reference signal. The output of the analog mixer 50 is thus a proportion KB of signal B, since the product of KA and zero is necessarily zero. Similarly, the output of the digital mixer 52 will be KA times signal A (digital) with zero contribution from KB since B input is fed a digital zero reference signal.

It should also be noted that with a plurality of analog and digital input signals, it may sometimes be convenient to first mix two analog input signals together or mix two digital input signals together before combining analog and digital signals together. For example, if two analog input signals are connected to analog inputs 1 and 2 and two digital input signals are connected to digital inputs 3' and 4', the two analog inputs may be selectively connected to the two inputs of the analog mixer 50 by appropriately controlling the crosspoints A1 and B2. The same control signals would then control crosspoints A1' and B2' so that digital zero reference signals would be supplied to both inputs of the digital mixer 52. The output of the analog mixer 50 would then be the desired portions of the analog input signals 1 and 2 and the output of the digital mixer 52 would be zero during active picture intervals. In the alternative, the two digital inputs could be selectively connected to the two inputs of the digital mixer 52 by appropriately controlling the crosspoints A3' and B4'. The same control signals would then control crosspoints A3 and B4 so that analog zero reference signals would then be supplied to both inputs of the analog mixer 50. The output of the digital mixer 52 would then be the desired portions of the digital input signals 3' and 4' and the output of the analog mixer 50 would be zero during active picture intervals.

In accordance with the present invention, the zero reference signals which are supplied to the analog and/or digital inputs where the video input sources are of the opposite form, can take several possible forms, depending upon whether the synchronizing information is included in the digital video signals, and the circuit requirements of the analog section of the switcher.

Practical analog switchers usually require synchronizing information which is derived from the input video signal. This is required primarily for operation of the control circuits, which are common to the analog and digital parts of the switching system of the present invention, and is also required for black level clamping circuits which are only needed with analog video signals.

One possible form of zero reference signal for the analog inputs which correspond to digital sources is to provide a signal with synchronizing information only, that is, standard synchronizing pulses and color burst signal with the level at intervening times being that corresponding to blanking, the blanking level being the zero reference level for picture information to an analog video signal. In this approach, synchronizing information is always obtained from the analog input, i.e. the input to the analog mixer 50, as indicated in FIG. 6. The digital inputs corresponding to analog sources are then supplied with a digital number corresponding to blanking level, it being noted that such a signal is not necessarily the digital number zero. Common practice in digital video systems is to assign a positive number to represent blanking level, thus avoiding the requirement to handle negative digital numbers for signal levels such as chrominance information which are negative with respect to blanking level. Accordingly, with this approach the synchronizing information would always be obtained from an analog input, that is, either on analog video input signal or an analog zero reference signal which contains only synchronizing information.

The digital video input sigals, as distinguished from the digital zero reference inputs, may or may not include synchronizing information. As described heretofore in connection with FIG. 5, the blanking generator 44 insures that synchronizing information is always obtained from one or the other of the sources supplied to the mixer and never from a combination of the two. If the digital video inputs do not include synchronizing information then no synchronizing information will appear at the output of the digital mixer 52 and synchronizing information will be obtained from the output of the analog mixer 50 for both analog and digital outputs of the switching system.

On the other hand, if the digital video inputs to the digital mixer 52 include synchronizing information this synchronizing information may be suppressed by applying blanking pulses from the blanking pulse generator 44 in the common control circuits of FIG. 5 to the digital mixer 52, as indicated by the input 66 in FIG. 6.

It is also possible to utilize the output of the digital mixer to provide all synchronizing information. To accomplish this, the digital zero reference signals must include synchronizing information. This can be achieved by deriving the signals for the digital zero reference input from the analog zero reference input through a suitable analog to digital converter. It is also assumed under these conditions that all of the digital video inputs to the digital mixer will include synchronizing information. Under these circumstances, a blanking pulse from the blanking pulse generator 44 is then supplied to the analog mixer 50 so as to prevent the appearance of any synchronizing information in the output of this mixer since synchronizing information is to be taken entirely from the digital mixer 52.

A third alternative approach which is possible if the digital video inputs contain synchronizing information, is to provide blanking pulses from the blanking pulse generator 44 to both the digital to analog converter 62 and the analog to digital converter 58. With such an arrangement the analog output from the summing circuit 64 obtains analog synchronizing information from the analog mixer 50 and the digital output of the summing circuit 60 obtains digital synchronizing information from the digital mixer 52. Summation of synchronizing information from both paths is thus avoided by blanking both of the converters 58, 62 during blanking intervals.

An alternative to feeding synchronizing information and blanking level to those analog inputs which correspond to digital sources, is to feed a signal to these analog inputs which corresponds to black level. In the Americal television system black level includes a pedestal of 7.5 percent of the video range as measured from blanking level to white level. This alternative is quite practical because a black level signal is normally available in present day switchers utilizing the American system. If the analog inputs corresponding to digital sources are fed a signal corresponding to black level, this would result in the summation of this pedestal into the output by the summing circuits 60 and 64. Such an arrangement would be undesirable because the digital inputs supplied to the digital mixer 52 also normally contain the required pedestal. Such a condition may be readily avoided by subtracting the pedestal amplitude so that it does not appear in the output of either of the summing circuits 60, 64. For example, if a digital output is desired from the switching system a blanking pulse, derived from the blanking pulse generator 44, may be supplied as the additional input 68 (FIG. 6) to the analog to digital converter 58, this blanking pulse having an amplitude corresponding to 7.5 percent of the video range as measured from blanking level to white level. On the other hand, if an analog output is required from the switching system, a blanking pulse of 7.5 percent video range amplitude may be supplied from the blanking pulse generator 44 to the summing circuit 64 as the additional input 70 shown in FIG. 6.

While the present invention has been described in connection with a simple switching system for both digital and analog signals corresponding to the analog-only switcher of FIG. 1, it will be readily appreciated that the principles described may be extended to switchers of any complexity including those with the re-entrant capability described heretofore in connection with FIG. 2. In such a case, re-entry would be provided for both the analog and digital outputs of the first mix-/effect system, the signals for these re-entries being taken from the mixers, such as the mixers 50, 52 in FIG. 6 before the summing circuits 60, 64. The dual path outputs of the analog mixer 50 and digital mixer 52 are thus equivalent to the output of the mixer 16 shown in FIG. 2. By taking the outputs of these mixers prior to the summing circuits 60, 64 the dual path system for analog and digital video signals is preserved up to the output of the switching system. As described heretofore, the summing circuits 60, 64 are employed only after the last mixer stage of the switching system to combine the analog and digital portions of the composite video output signal to provide either an analog output or a digital output, in accordance with the requirements of the next succeeding piece of studio equipment.

From the foregoing, it will be appreciated that with the arrangement of the present invention all digital signals will remain digital throughout the switching system and all analog signals will likewise remain analog, thereby avoiding multiple conversions between the two forms of signal. A switcher constructed in accordance with the present invention can handle a mixture of digital and analog sources and provide both digital and analog outputs with no unnecessary conversion and thus minimal degradation of the signals.

Since the control functions are common to the analog and digital video paths, it is possible to provide an analog switcher in which the control signals are made accessible for linking to a digital unit which replicates only the video path and not the control signal generating functions of a conventional switcher. Since the control signal generating functions normally comprise a substantial part of a complete switcher, the arrangement of the present invention substantially simplifies a combined digital-analog switching system with attendant reduction in cost and complexity. Furthermore, by constructing an analog switcher with accessible control signals, such a switcher may be used independently, where only analog sources are present, and the digital video path unit added subsequently when the need for switching digital sources arises.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A combined analog and digital switching system for video signals, comprising a source of digital video input signals, a source of analog video input signals, first video signal mixing means having at least two analog signal inputs, second video signal mixing means having at least two digital signal inputs, means for selectively supplying said analog source input signals to one input of said first mixing means and supplying an analog zero reference signal to the other input thereof, means for selectively supplying said digital source input signals to one input of said second mixing means and supplying a digital zero reference signal to the other input thereof, means for converting the digital output of said second mixing means into a corresponding analog signal, and means for adding the analog output of said first mixing means to the output of said converting means to provide a composite analog video output signal.

2. The switching system of claim 1, which includes means for converting the analog output of said first mixing means into a corresponding digital signal, and means for adding the digital output of said second mixing means to the output of said analog-to-digital converting means to provide a composite digital video output signal.

3. The switching system of claim 1, wherein said first mixing means is controlled by a first analog control signal, means for converting said analog control signal into a corresponding digital control signal, and means for controlling said second mixing means in accordance with said digital control signal.

4. A combined analog and digital video input signal switching system, comprising analog mixing means having first and second analog inputs, digital mixing means having first and second digital inputs, means for selectively connecting digital video input signals to one digital input of said digital mixing means and an analog reference signal to the corresponding input of said analog mixing means, means for selectively connecting analog video input signals to one analog input of said analog mixing means and a digital reference signal to the corresponding input of said digital mixing means, and means for combining the outputs of said analog and digital mixing means to provide a desired composite video output signal.

5. The switching system of claim 4, which includes means for developing an analog control signal for said analog mixing means, means for converting said analog control signal into a corresponding digital control signal, and means for controlling said digital mixing means in accordance with said digital control signal.

6. The switching system of claim 4, which includes means for developing a control signal and means for controlling both said analog mixing means and said digital mixing means in accordance with said control signal.

7. The switching system of claim 4, which includes means for controlling said selective connecting means so that the selection of different video input sources may be changed only during vertical blanking intervals.

8. The switching system of claim 4, wherein said combining means comprises means for converting the digital output of said digital mixing means into a corresponding analog signal, and means for adding said corresponding analog signal and the output of said analog mixing means to provide a composite analog output signal.

9. The switching system of claim 4, wherein said combining means comprises means for converting the analog output of said analog mixing means into a corresponding digital signal, and means for adding said corresponding digital signal and the output of said digital mixing means to provide a composite digital output signal.

10. The switching system of claim 4, which includes a key signal generator common to said analog mixing means and said digital mixing means, and means for controlling both said analog mixing means and said digital mixing means in accordance with the output of said key signal generator.

11. The switching system of claim 4, which includes a chroma key signal generator common to said analog mixing means and said digital mixing means, and means for controlling both said analog mixing means and said digital mixing means in accordance with the output of said chroma key signal generator.

12. The switching system of claim 4, wherein said analog reference signal comprises synchronizing pulses and a color burst signal and the video signal between synchronizing pulses is at blanking level.

13. The switching system of claim 12, wherein said digital reference signal is a number corresponding to blanking level.

14. The switching system of claim 4, wherein said analog reference signal comprises synchronizing pulses and a color burst signal and the video signal between synchronizing pulses is at black level which is a fixed pedestal value above blanking level.

15. The switching system of claim 14, wherein said digital video input signal includes a digital pedestal signal during blanking intervals, and said combining means includes means for preventing either said analog pedestal or digital pedestal from appearing in said composite video output signal.

16. The switching system of claim 14, wherein said digital video input signal includes a digital pedestal value above zero blanking level, and said combining means comprises means for converting the analog output of said analog mixing means into a corresponding digital signal, means for adding said corresponding digital signal and the output of said digital mixing means, and means for subtracting out said fixed pedestal value of said analog reference signal, thereby to provide a composite digital output signal having said digital pedestal value during blanking intervals.

17. The switching system of claim 14, wherein said digital video input signal includes a digital pedestal value above zero blanking level, and said combining means comprises means for converting the digital output of said digital mixing means into a corresponding analog signal, means for adding said corresponding analog signal and the output of said analog mixing means, and means for subtracting out said digital pedestal value of said digital video input signal, thereby to provide a composite analog output signal having said analog pedestal value during blanking intervals.

18. The switching system of claim 4, which includes a pattern signal generator common to said analog mixing means and said digital mixing means, and means for controlling both said analog mixing means and said digital mixing means in accordance with the output of said pattern signal generator.

19. The switching system of claim 18, wherein said pattern signal generator develops an analog output signal, means for controlling said analog mixing means in accordance with said analog output signal, means for converting said analog output signal into a corresponding digital control signal, and means for controlling said digital mixing means in accordance with said digital control signal.

20. The switching system of claim 18, wherein said key signal generator develops an analog output signal, means for controlling said analog mixing means in accordance with said analog output signal, means for converting said analog output signal into a corresponding digital control signal, and means for controlling said digital mixing means in accordance with said digital control signal.

21. The switching system of claim 18, wherein said key signal generator develops a digital output signal, means for controlling said digital mixing means in accordance with said digital output signal, means for converting said digital output signal into a corresponding analog control signal, and means for controlling said analog mixing means in accordance with said analog control signal.

22. The switching system of claim 18, wherein said chroma key signal generator develops an analog output signal, means for controlling said analog mixing means in accordance with said analog output signal, means for converting said analog output signal into a corresponding digital control signal, and means for controlling said digital mixing means in accordance with said digital control signal.

23. The switching system of claim 18, wherein said chroma key signal generator develops a digital output signal, means for controlling said digital mixing means in accordance with said digital output signal, means for converting said digital output signal into a corresponding analog control signal, and means for controlling said analog mixing means in accordance with said analog control signal.

24. The switching system of claim 18, wherein said pattern signal generator develops a digital output signal, means for controlling said digital mixing means in accordance with said digital output signal, means for converting said digital output signal into a corresponding analog control signal, and means for controlling said analog mixing means in accordance with said analog control signal.

25. The switching system of claim 24, which includes means for converting the analog output of said first mixing means into a corresponding digital signal, and means for adding the digital output of said second mixing means to the output of said analog-to-digital converting means to provide a composite digital video output signal.

26. A combined analog and digital video input signal switching system, comprising means for developing a control signal corresponding to predetermined areas of a desired composite output image in which a digital video input signal and an analog input signal are to appear respectively, means for developing a first video output signal consisting of portions of said digital video input signal corresponding to said predetermined output image digital signal areas and a digital zero reference signal in the remaining portions thereof, means for developing a second video output signal consisting of portions of said analog video input signal corresponding to said predetermined output image analog signal areas and an analog zero reference signal in the remaining portions thereof, and means for combining said first and second video output signals to provide a composite video output signal corresponding to said desired output image.

27. The switching system of claim 26, wherein said combining means includes means for converting said first video output signal into a corresponding analog video signal, and means for adding said corresponding analog video signal and said second video output signal to provide a composite analog video output signal corresponding to said desired output image.

28. The switching system of claim 26, wherein said combining means includes means for converting said second video output signal into a corresponding digital video signal, and means for adding said corresponding digital video signal and said first video output signal to provide a composite digital video output signal corresponding to said desired output image.

29. A combined analog and digital video input signal switching system, comprising a digital video signal mixer having first and second digital input buses, an analog video signal mixer having first and second analog input buses, first and second digital input signal buses associated with said digital mixer, first and second analog input signal buses associated with said analog mixer, means for supplying a digital video input signal to said first digital input signal bus and an analog zero reference signal to said first analog input signal bus, means for supplying an analog video input signal to said second analog input signal bus and a digital zero reference signal to said second digital input signal bus, means for selectively connecting said first digital input signal bus to one of said digital mixer input buses and simultaneously connecting said first analog input signal bus to one of said analog mixer input buses, means for selectively connecting said second analog input signal bus to the other one of said analog mixer input buses and simultaneously connecting said second digital input signal bus to the other one of said digital mixer input buses, and means for combining the outputs of said digital mixer and said analog mixer to provide a desired composite video output signal comprising portions of both said digital video input signal and said analog video input signal.

30. The switching system of claim 29, which includes means for developing an analog control signal for said analog mixer, means for converting said analog control signal into a corresponding digital control signal, and means for controlling said digital mixer in accordance with said digital control signal.

31. The switching system of claim 29, wherein said combining means comprises means for converting the digital output of said digital mixer into a corresponding analog signal, and means for adding said corresponding analog signal and the output of said analog mixer to provide a composite analog output signal.

32. The switching system of claim 29, wherein said combining means comprises means for converting the analog output of said analog mixer into a corresponding digital signal, and means for adding said corresponding digital signal and the output of said digital mixer to provide a composite digital output signal.

33. The switching system of claim 29, wherein each of said selective connecting means includes a plurality of latches corresponding to said input buses, means for selectively supplying pulses which occur during vertical blanking intervals to any one of said latches to cause said one latch to assume an energized state, means interconnecting said plurality of latches and responsive to energization of any one latch for releasing any previously energized latch of said plurality of latches, and switch means controlled by said latch means when in an energized state to connect the corresponding input signal to one of said input buses.

34. A combined analog and digital video input signal switching system, comprising analog mixing means having first and second analog inputs, digital mixing means having first and second digital inputs, means for selectively connecting digital video input signals to one digital input of said digital mixing means and an analog reference signal having a fixed value during active picture intervals to the corresponding input of said analog mixing means, means for selectively connecting analog video input signals to one analog input of said analog mixing means and a digital reference signal to the corresponding input of said digital mixing means, and means for combining the outputs of said analog and digital mixing means while taking into account the value of said fixed reference signals, thereby to provide a desired composite video output signal.

35. A combined analog and digital video input signal switching system, comprising an analog video signal path including at least one analog video signal mixer, a digital video signal path including at least one digital video signal mixer, means common to said analog signal path and said digital signal path for controlling both said analog mixer and said digital mixer, and means for combining the outputs of said analog mixer and said digital mixer to provide a composite video output signal.

36. The switching system of claim 35, wherein said combining means comprises means for converting the digital output of said digital mixer into a corresponding analog signal, and means for adding said corresponding analog signal and the output of said analog mixer to provide a composite analog output signal.

37. The switching system of claim 35, wherein said combining means comprises means for converting the analog output of said analog mixer into a corresponding digital signal, and means for adding said corresponding digital signal and the output of said digital mixer to provide a composite digital output signal.

38. The switching system of claim 35, wherein said analog mixer has a plurality of analog inputs and said digital mixer has a plurality of digital inputs, said analog signal path including analog crosspoint means for selectively connecting different analog signals to said analog inputs, said digital signal path including digital crosspoint means for selectively connecting different digital signals to said digital inputs, and means common to said analog signal path and said digital signal path for controlling said crosspoint means in both of said signal paths.

39. The switching system of claim 38, wherein said crosspoint control means includes means for preventing selection of different analog and digital signals except during vertical blanking intervals.

40. The switching system of claim 35, wherein said analog signal path includes a plurality of analog mixers connected in series, said digital signal path includes a plurality of serially connected digital signal mixers one for each of said plurality of analog mixers, and said common control means is employed to control both said plurality of analog mixers and said plurality of digital mixers.

41. The switching system of claim 40, which includes means for combining the output of the last analog mixer of said serially connected plurality of analog mixers with the output of the last digital mixer of said serially connected plurality of digital mixers to provide a composite video output signal.

42. The switching system of claim 41, wherein said combining means comprises means for converting the digital output of said last digital mixer into a corresponding analog signal, and means for adding said corresponding analog signal and the output of said last analog mixer to provide a composite analog output signal.

43. The switching system of claim 41, wherein said combining means comprises means for converting the analog output of said last analog mixer into a corresponding digital signal, and means for adding said corresponding digital signal and the output of said last digital mixer to provide a composite digital output signal.

44. An analog video input signal switching system which is adaptable to accommodate one or more digital video input signals, comprising an analog video signal path including at least one analog mixer having first and second analog inputs and a control signal input, a plurality of analog switches for selectively connecting different analog video input signals to either one of said first and second analog inputs, each of said analog switches having a control input terminal, means for supplying first control signals to said analog switch control input terminals, means for supplying second control signals to said mixer control signal input, and connections to said analog switch control input terminals and said mixer control signal inputs for establishing a digital video signal path which is parallel to said analog signal path and is controlled by said first and second control signals.

45. A combined analog and digital switching system for video signals, comprising first and second sources of analog video input signals, first video signal mixing means having at least two analog signal inputs, second video signal mixing means having at least two digital signal inputs, means for supplying said first and second analog source input signals to said two analog signal inputs of said first video signal mixing means, means for supplying digital zero reference signals to said two digital signal inputs of said second video signal mixing means, means for converting the digital output of said second mixing means into a corresponding analog signal, and means for adding the analog output of said first mixing means to the output of said converting means to provide a composite analog video output signal.

46. The switching system of claim 45, which includes means for converting the analog output of said first mixing means into a corresponding digital signal, and means for adding the digital output of said second mixing means to the output of said analog-to-digital converting means to provide a composite digital video output signal.

47. A combined analog and digital switching system for video signals, comprising first and second digital video input signals, first video signal mixing means having at least two analog signal inputs, second video signal mixing means having at least two digital signal inputs, means for supplying said first and second digital source input signals to said two digital signal inputs of said second video signal mixing means, means for supplying analog zero reference signals to said two analog signal inputs of said first video signal mixing means, means for converting the digital output of said second mixing means into a corresponding analog signal, and means for adding the analog output of said first mixing means to the output of said converting means to provide a composite analog video output signal.

* * * * *